(12) United States Patent
Teodorescu

(10) Patent No.: US 12,525,790 B1
(45) Date of Patent: Jan. 13, 2026

(54) SNUBBER CIRCUIT

(71) Applicant: Horia Nicolai L. Teodorescu, Iasi (RO)

(72) Inventor: Horia Nicolai L. Teodorescu, Iasi (RO)

( * ) Notice: Subject to any disclaimer, the term of this patent is extended or adjusted under 35 U.S.C. 154(b) by 0 days.

(21) Appl. No.: 18/831,388

(22) Filed: Dec. 27, 2024

(51) Int. Cl.
*H02H 9/00* (2006.01)

(52) U.S. Cl.
CPC .................................. *H02H 9/005* (2013.01)

(58) Field of Classification Search
None
See application file for complete search history.

(56) References Cited

U.S. PATENT DOCUMENTS

| | | | | |
|---|---|---|---|---|
| 6,885,535 B2* | 4/2005 | Hummert | ............... | H02M 1/34 361/111 |
| 2002/0118496 A1* | 8/2002 | Petruska | ................... | H02P 7/04 361/57 |
| 2006/0244428 A1* | 11/2006 | Jitaru | .................... | H02M 3/155 323/222 |
| 2019/0115838 A1* | 4/2019 | Radic | ..................... | H02M 1/34 |

\* cited by examiner

*Primary Examiner* — Stephen W Jackson

(57) ABSTRACT

The invention relates to a snubber circuit, that is, a circuit for damping electrical oscillations that may occur in switched circuits, for example those with MOS switches. The snubber circuit uses filters and nonlinearities for achieving a compromise between power consumption and reduction of electrical oscillations of the circuit in which it is embedded. The snubber circuit operates in conjunction with the switches in the circuit from which it suppresses oscillations and is designed according to the operation of the circuit in which it is embedded and to the load resistance.

4 Claims, 3 Drawing Sheets

SNUBBER CIRCUIT

CROSS-REFERENCE TO RELATED PATENT APPLICATION

This application claims the benefit of priority to Romanian Patent Application Number A00482/2024 filed Aug. 21, 2024. The entire content of this identified application is incorporated herein by reference.

References cited, which include patents, patent applications, and non-patent literature, may be discussed in the description. Such references are provided only to clarify the description and terminology and is not an admission that such references represent "prior art" to this description.

BACKGROUND OF THE INVENTION

Field of Invention

The invention relates to a protection circuit for electronic switching devices, generally known as snubber circuit, for fast-switching circuits, in which the circuit elements, in particular inductances and capacitances, as well as parasitic elements of the circuit in general and of the switching device in particular, store energy and can create disturbing or even destructive signals due to the weakly damped resonances of the respective inductive and capacitive elements.

The field of the invention is the electronics of switching circuits and, relatedly, the theory and practice of disturbances created by electromagnetic interference (EMI). The field and problem of the invention are reflected in the reference list attached of this description.

DISCUSSION OF THE BACKGROUND

Current State of the Art

Protection circuits for switching circuits, also called "snubbers", are known and extensively used. These circuits fall in two categories, passive snubbers and active snubber circuits with partial energy recovery. The present invention relates to passive circuits. Passive snubber circuits for switching circuits are typically based on resistors, capacitors and rectifying diodes, sometimes also including Schottky diodes.

Presentation of the Technical Problem

The problem to solve is that of the unsatisfactory elimination of the effects of parasitic resonances of switching circuits, for example in circuits with power MOS transistors or switching thyristors; also, the problem to solve is that of avoiding dangerous signal surges due to inductances in the switching circuit and the rapid variations of voltage, $dU/dt$, and of the current, $dI/dt$, for the electrical switching devices in the circuit.

Further, the problem solved is to improve the efficiency of the suppression of voltage surges without drastically distort the switching edges of the signals, where slow switching edges cause an increase in the power consumed by the switching circuit and by the snubber.

In addition, the snubber has to provide an impedance adaptation with the load to which it is connected, such that the reflections are reduced, as the reflections cause overvoltages and overcurrents that are detrimental for electromagnetic interference performances.

These requirements necessitate a transfer function of the snubber more intricate than that of a simple low-pass filter or than that of a damped resonant circuit; also, these requirements necessitate a matching of the resistance of the snubber to the resistance of the load, and may necessitate a nonlinear behavior of the snubber such that its operation compromises between the conditions of fast damping and reduced reflections.

BRIEF DESCRIPTION OF THE DRAWINGS

In connection with FIGS. 1-6, the embodiments of the invention and the related operating principles are set forth below. None of the figures is to scale.

All figures exemplify circuits as particular, non-restrictive examples.

DETAILED DESCRIPTION

Below, we present in connection with FIGS. 1-7, the concept and the way of realization and operation of the snubber circuit of an electronic switch, according to the invention. In the description, concrete examples of the snubber circuit, as well as of the protected element, are used, but these examples are not limiting.

Figure 1:
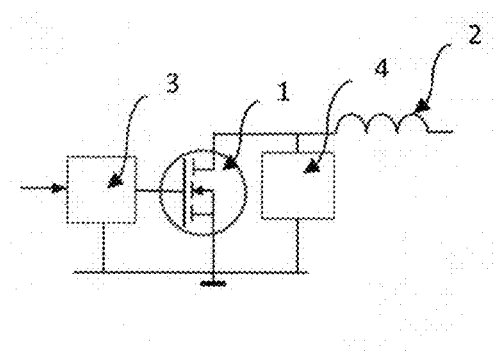
FIG. 1 is a general outline of the structure of and schematically illustrates a general configuration of achieving the protection of an electronic switch and for achieving the reduction of electromagnetic interference of the switch circuit.

FIG. 1 represents the typical way of performing the protection and interference suppression of a MOS transistor type switch, 1, with inductive load 2, namely with a snubber circuit 3 in the transistor grid and with a snubber circuit 4 in parallel with the switch MOS, namely between the drain and the source of the transistor. The invention relates to the way of designing and making circuits 3 and 4.

Figure 2:
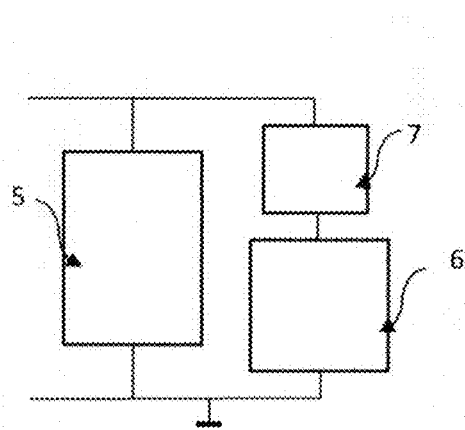
FIG. 2 represents a non-limiting example of a schematic diagram of the snubber circuit according to the invention.

FIG. 2 represents a non-limiting example of a sketch of the invention, a diagram containing an element 5, of filter type and which is typically linear, in parallel with the group of series circuits 6 and 7, of which circuit 6 is typically a linear filter and element 7 is typically a non-linear device or a circuit that includes a non-linear device. Non-limiting examples of non-linear devices that can be used are a Zener diode, thermistor, a posistor, or an electroluminescent diode coupled to a photoresistor. The element 7 can also be constituted by several non-linear devices, for example, without limitation, a Zener diode and a posistor in series. The position of elements 6 and 7 can be reversed, with element 7 coupled with one terminal to ground. More groups of series elements 6 and 7 can be connected in parallel to provide the desired amplitude and frequency behavior.

Figure 3:
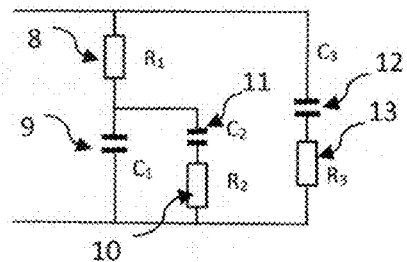
FIG. 3 illustrates a non-limiting example of embodiment of the linear element of complex filter type, according to the invention.

FIG. 3 illustrates a non-limiting example of the linear element of the filter type, 5, according to the invention. The components of this linear filter are thus connected and determined as values so that the impedance between the terminals of the element is high or moderate in the frequency band that determines the quality of the fronts of the switching element. Namely, the respective frequency band must include the fundamental component and the first odd harmonics of the spectrum of the periodic switching signal as well as the frequency determined by the width of the switching front and the main harmonics of this frequency.

The snubber circuit in FIG. 3, which is a non-limiting example of an embodiment of the linear element of the filter type, 5, according to the invention, consists of two groups of linear passive elements connected in parallel. The first group consists of a resistor 8 in series with a parallel group formed by the capacitor 9 in parallel with the subgroup formed by the resistor 10 in series with the capacitor 11. The second group is constituted by a capacitor 12 in series with a resistor 13. This is one of the many configurations suitable for adjusting the bandwidth of the snubber such that is attenuates a specific band of frequencies while leaving components of the signal in other specific bands less attenuated, such as to preserve good edges of the switching signal.

Figure 4:
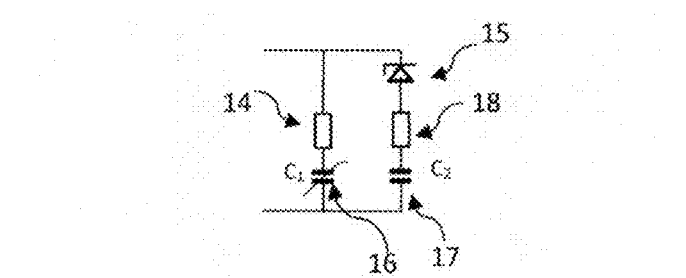
FIG. 4 illustrates an embodiment of the non-linear element according to the invention. This type of nonlinear circuit is exemplified as a particular, non-restrictive case.

FIG. 4 illustrates a nonlimiting example of the realization of the non-linear element, according to the invention, in the form of two groups of elements connected in parallel, the first group being made up of a series voltage dependent capacitor 16 with a resistor 14, and the second group being made up of a capacitor 17 in series with a Zener diode 15 and a resistor 18. When the voltage at the terminals exceeds the Zener threshold value, the diode opens and the impedance of the snubber circuit decreases; at the same time, the frequency band in which disturbances are strongly reduced by the circuit also changes. Any of the resistors 14 and 17 can be replaced by a negative or positive coefficient thermistor. For example, at high dissipated energies due to large disturbances, the thermistor reduces its resistance and thus reduces the equivalent resistance of the whole group in FIG. 4.

In all discussed configurations, the equivalent resistance of the snubber, as seen by a series load during the discharge of the reactive energy of the load, should match or closely approximate the equivalent load resistance, in order to reduce reflections due to unmatching. These reflections typically have high frequencies, may have high voltages and may destroy the switcher and produce electromagnetic interference. Whenever reflections can be high, the matching as above has precedence on the condition of damped oscillator, as used in known designs of snubbers; this is a key aspect of the present invention.

Figure 5:
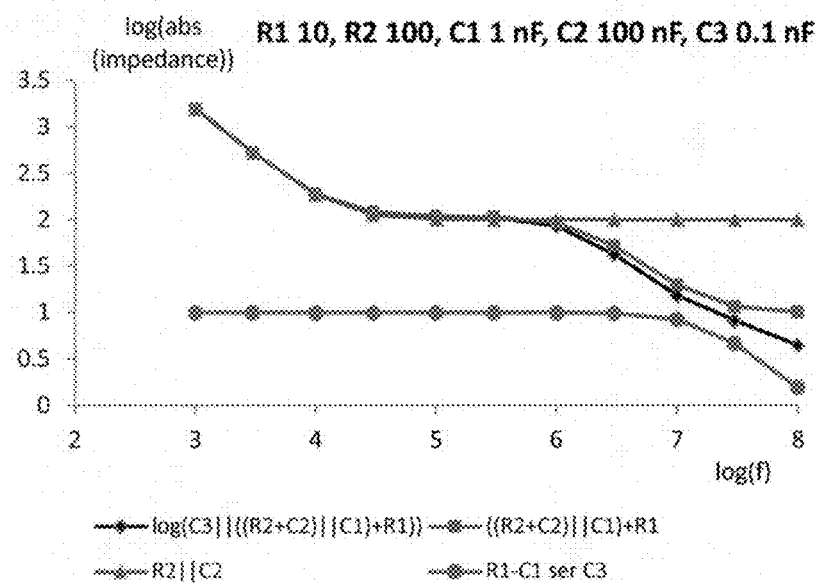
FIG. 5 illustrates a non-limiting embodiment of a snubber and the variation with frequency of the impedance between the terminals of a linear filter type circuits for snubbers, according to the invention.

FIG. 5 compares the variation with frequency of the impedance between the terminals of a linear filter type circuit as in FIG. 3, as well as of its sub-circuits, showing how to change the typical impedance of a series RC circuit, as used in common snubbers, into a more complex operation that trades off between signal edge preservation and high frequencies attenuation.

One limitation of snubbers with passive components, as illustrated in FIGS. 1-5, is that they cannot adapt to a variety of conditions such as variable load and parasitic components of the switcher and load circuits. For providing adaptation to various conditions, one or several resistors may be replaced by digitally controlled resistors controlled by one or several microsystems. In the literature, digitally controlled resistors are also known as digital potentiometer, as resistive digital-to-analog converter (digipot), or as digitally-controlled electronic resistors. The values of these resistors can be set by the user using the microsystem. In advanced versions of the snubber realizations, the microsystem analyzes the signal on the load, or measures the load impedance, or both, and adjusts the value or values of the digitally controlled resistors in accordance with the measurements. In a simple example, the value of the resistors of the snubber are modified such that the equivalent series resistance of the snubber equals or approximates closely the value of the resistance of the load, thus reducing reflections.

Figure 6:
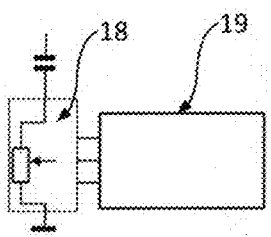
FIG. 6 illustrates a non-limiting embodiment of a part of the snubber circuit, according to the invention, which includes a digital potentiometer device 18, also known as digitally controllable resistor, whereas the digital potentiometer 18 is controlled by a microsystem 19 and is used as a replacement of a fixed resistor in the snubber circuit.
Figure 7:
FIG. 7 illustrates a non-limiting embodiment of a snubber circuit, according to the invention, where the microsystem 19 also perform through a connection 20 a measurement of the signal or of the resistance of the load, in order to adapt the digital potentiometer value to that of the load and reduce reflections.

In the adaptive versions as in FIGS. 6 and 7, the snubber circuits adapt to the load resistance and to the specific leak (parasitic) components of the actual circuit to which the snubber is connected. The simpler configuration in FIG. 6 allows the user to program the snubber for a specific load resistance.

The snubber circuits according to the invention provide better protection of the protected switch against overvoltages and overcurrents as well as against high dU/dt and dI/dt values, simultaneously allowing switching with good edges and with low reflections.

The industrial realization of the invention can be done by known technical means. The simplest industrial realization is in the form of a circuit mounted on a printed circuit board (PCB). The invention can also be realized in the form of modules or integrated circuits.

The snubber circuit according to the invention can be made as an independent, integrated module, which can be planted on the wiring as a single piece, or which is connectable, as a single piece, by the wiring surface mounting technology.

The snubber circuit according to the invention can be made as a single module together with the switching element, which module can be soldered as a single element on the wiring.

The snubber circuit, according to the invention, can be made in the form of an integrated circuit that also includes the protected switching element.

REFERENCES

Patents

US2024227581 (A1)—2024 Jul. 11, Contained Package for Automotive Inverter And Y-Snubber Components. Inventor Bhat Krishna Prasad; Chen Chingchi; Parsa Nitin; Sanphuang Varittha; Degner Michael W; Wu Hongjie KR20240005458 (A)—2024 Jan. 12, Multilayer ceramic capacitor for snubber, Inventor Oh Young Joo; Yoon Jung Rag; Seo Seock No WO2024049911 (A2)—2024 Mar. 7, Electronic Snubber for Elimination Of Switch Contact Impedance Increase And Arc Contaminant Deposition, Inventor Guziak Robert US2023403003 (A1)—2023 Dec. 14, Integrated Resistor-Transistor-Capacitor Snubber, Inventor Roig-Guitart Jaume; Probst Dean; Challa Ashok US2022407411 (A1)—2022 Dec. 22, Integrated Transistor and Resistor-Diode-Capacitor Snubber. Inventor Probst Dean E; Yedinak Joseph Andrew; Padmanabhan Balaji; Burke Peter A; Neuls Jeffery A; Challa Ashok US2023369967 (A1)—2023 Nov. 16, Active Snubber Circuit and Buck Converter, Inventor Kanda Keisuke; Ushitani Koichi US2023032223 (A1)—2023 Feb. 2, Power Module with An Integrated Aluminium Snubber Capacitor. Inventor Ebel Thomas; Schletz Andreas US2023395335 (A1)—2023 Dec. 7, Solid State Circuit Breaker Snubber. Inventor Mclean Andrew US2023029203 (A1)—2023 Jan. 26, Snubber Circuit. Inventor Kim Kyung Hyun Non-Patent Literature J.-H. Cha, S.-J. Park, S.-G. Song and F.-s. Kang, "Surge Voltage Suppression using Dual MOVs and Modified RC Snubber Circuit Structure in a DC Solid-State Circuit Breaker," 2024 10th International Conference on Applied System Innovation (ICASI), Kyoto, Japan, 2024, pp. 279-281, doi: 10.1109/ICASI60819.2024.10547933.

C. K. Campbell, J. D. van Wyk, M. F. K. Holm, J. J. R. Prinsloo and J. J. Schoeman, "Steady-state and transient C-V response of a high-voltage nonlinear barium titanate ceramic-disc power-snubber capacitor," 1992 Proceedings 42nd Electronic Components & Technology Conference, San Diego, CA, USA, 1992, pp. 607-610, doi: 10.1109/ECTC.1992.204265.

S. J. Finney, B. W. Williams and T. C. Green, "RCD snubber revisited," in IEEE Transactions on Industry Applications, vol. 32, no. 1, pp. 155-160, January-February 1996, doi: 10.1109/28.485827.

F. W. Combrink, H. T. Mouton, J. H. R. Enslin and H. Akagi, "Design optimization of an active resonant snubber for high power IGBT converters," in IEEE Transactions on Power Electronics, vol. 21, no. 1, pp. 114-123, January 2006, doi: 10.1109/TPEL.2005.861199.

Xiangning He, A. Chen, Hongyang Wu, Yan Deng and Rongxiang Zhao, "Simple passive lossless snubber for high-power multilevel inverters," in IEEE Transactions on Industrial Electronics, vol. 53, no. 3, pp. 727-735, June 2006, doi: 10.1109/TIE.2006.874422.

C. K. Campbell, J. D. Van Wyk and M. F. K. Holm, "Observations on competing mechanisms governing the C-V responses of nonlinear ceramic capacitors," in IEEE Transactions on Components, Packaging, and Manufacturing Technology: Part A, vol. 18, no. 1, pp. 226-229, March 1995, doi: 10.1109/95.370759.

I. W. Hofsajer, J. A. Ferreira, J. D. van Wyk and M. F. K. Holm, "A planar integrated RCD snubber/voltage clamp," in IEEE Industry Applications Magazine, vol. 1, no. 5, pp. 24-29, September-October 1995, doi: 10.1109/2943.407081.

The invention claimed is:

1. The snubber circuit, according to the invention, is characterized by the fact that it includes, but is not limited to,
   a sub-network of resistors and capacitors connected in series and in parallel, acting as a filter, the said sub-network whose impedance between two terminals is chosen in such a way as to eliminate frequencies at which resonances occur due to load inductive elements or in a switch circuit, while preserving the frequency components that contribute to the spectrum of fast switching fronts;
   one or more subnets of resistive, capacitive, or combined resistance and capacitance type may be connected in series with at least one non-linear element, such as, but not limited to, diode, Zener diode, thermistor, posistor, photodiode and photoresistor optocoupler or similar, or any combination of them, the said subnet consisting of one or more subnets and non-linear elements being connected in parallel or in series with a first subnet and having the role of determining a mode of operation as a filter of a first subnet according to the value of the signal amplitude, so that signals of large amplitudes are filtered differently from signals of amplitudes smaller than the value of the switch supply voltage,
   whereas an equivalent resistance of a snubber that is in series with a load during the discharge of an energy of a reactive load is chosen to be close to a value of equivalent resistance of that load;
   whereas the snubber may include one or several digitally controlled resistors that are controlled by a microsystem
      whereas the said microsystem may perform an analysis of signals on a load, or of a load impedance, or both, automatically controlling one or several digitally controlled resistors in accordance to results of that analysis.

2. The snubber circuit, according to claim 1, characterized in that it is made as an independent, integrated module, which can be planted on a printed circuit board as a single piece, including using surface mounting technology, or which is connectable, as a single piece, to a wiring of a switching circuit.

3. The snubber circuit, according to claim 1, characterized in that it is made as a single module together with a switching element, which module can be soldered as a single element on the printed circuit board or to a wiring of a switching circuit.

4. The snubber circuit, according to claim 1, characterized in that it is made in a form of an integrated circuit that also may include a protected switching element.

* * * * *